US006743865B2

(12) United States Patent
Mekhilef et al.

(10) Patent No.: US 6,743,865 B2
(45) Date of Patent: Jun. 1, 2004

(54) FLUOROPOLYMER BLENDS

(75) Inventors: Nafih Mekhilef, Upper Merion, PA (US); Saeid Zerafati, Voorhees, NJ (US)

(73) Assignee: ATOFINA Chemicals, Inc., Philadelphia, PA (US)

( * ) Notice: Subject to any disclaimer, the term of this patent is extended or adjusted under 35 U.S.C. 154(b) by 0 days.

(21) Appl. No.: 10/183,703

(22) Filed: Jun. 28, 2002

(65) Prior Publication Data

US 2004/0001928 A1 Jan. 1, 2004

(51) Int. Cl.⁷ .............................................. C08L 27/12
(52) U.S. Cl. ...................................................... 525/199
(58) Field of Search ........................... 525/199; 252/199

(56) References Cited

U.S. PATENT DOCUMENTS

| | | | |
|---|---|---|---|
| 4,302,556 A | * 11/1981 | Endo et al. ................. | 525/199 |
| 5,008,340 A | * 4/1991 | Guerra et al. ............... | 525/193 |
| 5,106,911 A | * 4/1992 | Chapman et al. .......... | 525/199 |
| 5,109,071 A | * 4/1992 | Johnson et al. ............ | 525/199 |
| 5,429,849 A | 7/1995 | Lasson et al. ............. | 428/36.9 |
| 6,538,069 B2 | * 3/2003 | Faulkner ..................... | 525/199 |

FOREIGN PATENT DOCUMENTS

| WO | WO 95 27988 | 10/1995 |
|---|---|---|
| WO | WO 01 98405 | 12/2001 |

OTHER PUBLICATIONS

A. Siegman, et la., "The Crystallization and Transition Bahaviour of Poly(vinylidene Fluoride)/Copoly(chlorotriofluorethlene–vinyledene Fluoride) Blends" Journal of Applied Polymer Science, vol. 27, 1989, pp. 1481–1489.

J. W. Cho, et al., "Cocrystallization and Miscibility In Blends of Vinylidene Fluoride—Tetrafluoroethylene and Vinylidene Fluoride—Hexafluoroacetone Copolymers", Polymer Journal, Society of polymer Science, Tokyo, JOP, vol. 25, No. 12, Dec. 15, 1993, pp. 1267–1274.

* cited by examiner

*Primary Examiner*—Nathan M. Nutter
(74) *Attorney, Agent, or Firm*—William D. Mitchell

(57) ABSTRACT

Multi-phase blends of VDF-based polymers are provided which are useful in a variety of applications such as wire and cable, pipe and liner applications, and rotational molding.

11 Claims, No Drawings

FLUOROPOLYMER BLENDS

BACKGROUND OF THE INVENTION

This invention relates to multi-phase polymer blends of vinylidene fluoride (VDF) based polymers, especially to such blends wherein at least one of the polymers is a VDF-based copolymer and wherein the properties of the polymer blends can be tailored to meet the intended application. "Copolymer" is used herein in its broadest sense to include polymers made from at least two different monomers, such as terpolymers. The blends are useful in a variety of applications, such as wire and cable, pipe and liner applications, sheet extrusion, polymer foams, thermoforming, injection molding and rotational molding.

While many commercially available polyvinylidene fluoride (PVDF) homopolymers and VDF-based copolymers, such as VDF/hexafluoropropylene (HFP) and VDF/chlorotetrafluoroethylene (CTFE) copolymers, already have properties (such as good tensile strength, flexibility and the like) that make them suitable for certain applications, it would be useful to have a method of combining such polymers so as to be able to enhance certain properties, such as resistance to chemicals and impact resistance, for specific end-use applications.

Blends of PVDF homopolymer and VDF-based copolymers have been disclosed in U.S. Pat. No. 5,429,849, but they only cover single phase blends with 25–75 weight % PVDF. VDF-based copolymers useful in this invention have been disclosed, for example, in U.S. Pat. No. 6,187,885 on VDF/HFP copolymers and in U.S. Pat. No. 4,946,900 on VDF/CTFE copolymers. For the purpose of this application, the copolymers described in these latter two patents will be herein referred to as "heterogeneous" copolymers.

BRIEF SUMMARY OF THE INVENTION

Multi-phase polymer blends are provided which comprise a VDF-based copolymer and at least one other polymer selected from PVDF homopolymer or another VDF-based copolymer, as well as various applications of such polymer blends for wire and cable, sheet, injection molding, rotomolding, pipe and tube, and the like. Preferred copolymers are the VDF/HFP and VDF/CTFE copolymers, particularly the heterogeneous VDF/HFP and VDF/CTFE copolymers described in the foregoing paragraph.

DETAILED DESCRIPTION

It has now been found that two or more different VDF-based polymers can be mixed to create multi-phase blends which match certain properties of existing copolymers while enhancing certain other properties so to custom make polymers suitable for specific end uses. These blends are made by using methods known in the art to create homogeneous dispersions of VDF-based polymers, such as by melt mixing via extrusion. Other methods include latex blending, powder blending, solvent blending and the like.

While the detailed discussion below will focus on the VDF/HFP copolymers, this invention is also applicable to VDF-based copolymers made by substitution of one or more other comonomers, such as CTFE, tetrafluoroethylene (TFE), perfluoromethyl vinyl ether (PMVE), perfluoroalkyl vinyl ether (PAVE), vinyl fluoride (VF) and/or trifluoroethylene (TFE), for some or all of the hexafluoropropylene.

For example, as shown below, it is possible to substantially duplicate many of the properties of a VDF/HFP copolymer containing 10 weight % HFP, while enhancing its impact resistance and chemical resistance, by creating either (a) a 43/57 weight blend of a PVDF homopolymer with a VDF/HFP copolymer having about 17 weight % HFP wherein the blended polymers have essentially the same viscosity or (b) a 50/50 weight blend of a VDF/HFP copolymer containing about 5 weight % HFP with a VDF/HFP copolymer containing about 15 weight % HFP wherein the blended polymers have essentially the same viscosity.

In the examples below, the polymers and blends were extruded with a twin screw extruder and the test specimens required for mechanical testing were produced by injection molding. Mechanical testing, such as Izod impact resistance, chemical resistance testing and the like are then performed on the polymers.

The practice of the invention is illustrated in more detail in the following non-limiting examples.

The illustrative tests include those described above wherein a VDF/HFP copolymer containing about 10 weight % HFP (designated "Standard A") is compared to two multi-phase blends of the subject invention, a 43/57 weight blend of a PVDF homopolymer with a VDF/HFP copolymer having about 17 weight % HFP wherein the blended polymers have essentially the same viscosity (Example 1) and a 50/50 weight blend of a VDF/HFP copolymer containing about 5 weight % HFP with a VDF/HFP copolymer containing about 15 weight % HFP wherein the blended polymers have essentially the same viscosity (Example 2). All processing conditions were the same, allowing comparison of the blend properties. While the pure material of Standard A has a single melting point, determined by differential scanning calorimetry (DSC), of about 144° C., the multi-phase blends are found to have two melting points, 114° C. and 170° C. for Example 1 and 136° C. and 156° C. for Example 2. The two observed peaks of the blends correspond to the melt temperature of pure polymers involved in the blends. Similarly, the multi-phase blends also were found to have different temperatures of crystallization. While most properties of the blends of Examples 1 and 2 are only slightly different than that of the pure polymer of Standard A (such as tensile strength, ductility and elongation at break), the blends show improved impact resistance and chemical resistance.

The results (in Joules/meter) of Izod impact strength tests, where dimensions were measured according to ASTM D256, were as follows: At 23° C., the polymer of Standard A had impact strength of 822, while the polymers of Examples 1 and 2 had impact strengths of 988 and 1030, respectively. The results at 10° C. were 96, 123 and 529. At 0° C. the results were 64, 96 and 101. In these tests, notching was done with a milling machine. For each product, the impact energy was measured with an Izod-Charper Impact Tester and the reported result is the average of 7 measurements of different specimens.

Each polymer was also tested for resistance to concentrated (37%) hydrochloric acid. This test consists of a comparison of color (in terms of a Yellowness Index or YI) before and after 7 days immersed in acid at 50° C. A CR-300 Tristimulus Colorimeter from Minolta was used to determine the Yellowness Index (YI). YI is calculated in accordance with ASTM E313–98. After 7 days, the polymer of Standard A underwent a change in YI of 24.49, while the polymers of Examples 1 and 2 underwent a change in YI of only 2.64 and 5.02, respectively. When tested for resistance to sulfuric and nitric acids, however, the results for all of the polymers were similar.

Another test demonstrates how creation of the inventive multi-phase blends can be used to improve melt fracture properties. In this experiment the melt fracture of a 50/50 weight blend of a PVDF hompolymer with a heterogeneous VDF/HFP copolymer having about 10 weight % HFP (Example 3) was compared to that of a VDF/HFP copolymer having about 5 weight % HFP (Standard B) and to that of the two components of the blend, the copolymer with 10 weight % HFP (Standard C) and the homopolymer (Standard D), using a capillary rheometer with die diameter of 0.03 inch and die length of 0.3 inch at 260° C. For Standard B, C and D, melt fracture was observed at 1000 seconds$^{-1}$ ($S^{-1}$), 1000 $S^{-1}$, and 5000 $S^{-1}$, respectively, while for the inventive blend of Example 3 melt fracture was not observed up to 8000 $S^{-1}$. This improvement has particular applicability for increasing the productivity of wire and pipe lines by increasing the line speed while keeping good surface and physical qualities. Thus, this material could be extruded at high speed lines for wire covering. It would also be useful for high temperature multi-layer wiring.

The improved properties which can be generated through the creation of these multi-phase polymers makes it possible to tailor make such polymers for wire and cable, rotomolding, and tubing, among other applications. Some examples are set forth below:

For wire and cable, blends of PVDF homopolymer and VDF-based copolymers are particularly useful. Wire produced with these blends, such as via melt processing, can be tailor made to have improved room and low temperature impact performance, cold bend performance, ductility, cross-linkability, chemical resistance and the like.

Standard injection molding machines can be used to convert this material into parts such as connectors, fittings and valves for pipes. The generated parts have improved notch sensitivity and toughness.

For sheets, these blends can be cast, such as by extruding the molten material through a sheet die and sizing it with a three roll sizer, or compression molded by pouring the material into a mold and heating in a press. The resultant sheets have improved toughness during transportation and subsequent use. Such sheets are useful in making tank liners or formed articles.

Parts can also be made by grinding the polymer material and then rotomolding the ground material. Such parts have good toughness, rigidity and permeation properties which make them particularly useful in fuel and chemical tanks.

Pipes and tubing can be made from this polymer material by extruding it through a pipe die and running it through a calibrator and cooling tank. The resulting pipe has the advantage of high rigidity and toughness at room and low temperatures. The pipe can also be used as a pipe liner with improved stress resistance or for automotive fuel lines.

We claim:

1. A thermoplastic, non-elastomeric, multi-phase polymer blend comprising a vinylidene fluoride based copolymer and at least one other polymer selected from the group consisting of polyvinylidene fluoride homopolymer and a vinylidene fluoride-based copolymer.

2. A thermoplastic, non-elastomeric, multi-phase polymer blend comprising a vinylidene fluoride bused copolymer and a polyvinylidene fluoride homopolymer.

3. A polymer blend as in claim 2 comprising a heterogeneous vinylidene fluoride based copolymer and a polyvinylidene fluoride homopolymer.

4. A polymer blend as in claim 3 comprising a heterogeneous vinylidene fluoride/hexafluoropropylene copolymer and a polyvinylidene fluoride homopolymer.

5. A polymer blend as in claim 4 where the copolymer contains about 10 weight % hexafluoropropylene.

6. A polymer blend as in claim 3 comprising a heterogeneous vinylidene fluoride/chlorotetrafluoroethylene copolymer and a polyvinylidene fluoride homopolymer.

7. A thermoplastic, non-elastomeric, multi-phase polymer blend comprising two vinylidene fluoride based copolymers.

8. A multi-phase polymer blend as in claim 7 wherein at least one of the copolymers is a heterogeneous copolymer.

9. A multi-phase polymer blend as in claim 7 wherein at least one of the copolymers is a heterogeneous vinylidene fluoride/hexafluoropropylene copolymer.

10. A multi-phase polymer blend as in claim 7 wherein at least one of the copolymers is a heterogeneous vinylidene fluoride/chlorotetrafluoroethylene copolymer.

11. A polymer blend as in claim 8 comprising two vinylidene fluoride/hexafluoropropylene copolymers containing different levels of hexafluoropropylene.

* * * * *